(12) United States Patent
Wu

(10) Patent No.: US 11,477,487 B2
(45) Date of Patent: Oct. 18, 2022

(54) SUBPICTURE SIGNALING IN VIDEO CODING

(71) Applicant: ZTE (UK) Limited, Brentford (GB)

(72) Inventor: Ping Wu, Brentford (GB)

(73) Assignee: ZTE (UK) Limited, Brentford (GB)

( * ) Notice: Subject to any disclaimer, the term of this patent is extended or adjusted under 35 U.S.C. 154(b) by 0 days.

(21) Appl. No.: 16/852,399

(22) Filed: Apr. 17, 2020

(65) Prior Publication Data

US 2021/0176500 A1 Jun. 10, 2021

Related U.S. Application Data

(63) Continuation-in-part of application No. 16/709,907, filed on Dec. 10, 2019, now Pat. No. 11,375,232.

(51) Int. Cl.
*H04N 19/70* (2014.01)
*H04N 19/184* (2014.01)
*H04N 19/169* (2014.01)
*H04L 65/70* (2022.01)

(52) U.S. Cl.
CPC .......... *H04N 19/70* (2014.11); *H04L 65/70* (2022.05); *H04N 19/184* (2014.11); *H04N 19/188* (2014.11)

(58) Field of Classification Search
None
See application file for complete search history.

(56) References Cited

U.S. PATENT DOCUMENTS

2015/0373361 A1* 12/2015 Wang .................. H04N 19/573
375/240.16

OTHER PUBLICATIONS

Wang, Ye-Kui, AHG12: On mixed NAL unit types within a picture, Jul. 12, 2019, Joint Video Experts Team (JVET) of ITU-T SG 16 WP 3 and ISO/I EC JTC 1/SC 29/WG 11, JVET-O0140-v2. (Year: 2019).*

Bross, B. et al., "Versatile Video Coding (Draft 7)," Joint Video Experts Team (JVET) of ITU-T SG 16 WP 3 and ISO/IEC JTC 1/SC 29/WG 11, Geneva, Switzerland, 16th Meeting, Document JVET-P2001-vE, 491 pages, Oct. 2019.

Wang, Ye-Kui, "AHG12: On mixed NAL unit types within a picture," Jul. 12, 2019, Joint Video Experts Team (JVET) of ITU-T SG 16 WP 3 and ISO/IEC JTC 1/SC 29/WG 11, JVET-O0140-v2. (Year: 2019), 3 pages.

International Search Report and Written Opinion in International Application No. PCT/EP2020/085239, dated Feb. 22, 2021, 12 pages.

(Continued)

*Primary Examiner* — James M Anderson, II
(74) *Attorney, Agent, or Firm* — Perkins Coie LLP

(57) ABSTRACT

Methods and apparatus for video bitstream processing are described. The processing may include encoding, decoding or transcoding of digital video. One example method of video bitstream processing includes parsing, for decoding a video picture comprising one or more subpictures, a syntax structure to obtain type information about one or more network abstraction layer (NAL) units making up the video picture and whether the video picture is an intra random access picture (IRAP) and reconstructing the one or more subpictures based on the parsing.

20 Claims, 11 Drawing Sheets

(56) References Cited

OTHER PUBLICATIONS

Ping Wu (ZTE): 11 AHG9: On mixed NAL unit types in a video picture, 17. JVET Meeting; Jan. 7, 2020-Jan. 17, 2020; Brussels; (The Joint Video Exploration Team of ISO/IEC JTC1/SC29/WG11 and ITU-TSG.16 ) No. JVET-Q0163, Dec. 28, 2019 (Dec. 28, 2019), XP030222747, Retrieved from the Internet:URL:http://phenix.int-evry.fr/jvet/doc enduser/documents/17 Brussels/wgll/JVET-Q0163-vl.zip JVET-Q0163.docx [retrieved on Dec. 28, 2019] 8 pages.

Y-K Wang (Huawei) et al: 11 AHG12/AHG17: Allowing mixed IRAP and non-IRAP NAL unit types within a picture, 14. JVET Meeting; Mar. 19, 2019-Mar. 27, 2019; Geneva; (The Joint Video Exploration Team of ISO/IEC JTC1/SC29/WG11 and ITU-T SG.16) No. JVET-N0108 Mar. 12, 2019 (Mar. 12, 2019), XP030254476, Retrieved from the Internet: URL:http://phenix.int-evry.fr/jvet/doc end user/documents/14 Geneva/wgll/JVET-N0108-vl.zip JVET-N0108-vl.docx [retrieved on Mar. 12, 2019] 4 pages.

* cited by examiner

SUBPICTURE SIGNALING IN VIDEO CODING

CROSS REFERENCE TO RELATED APPLICATIONS

This patent document is a continuation-in-part of and claims benefit of priority to U.S. patent application Ser. No. 16/709,907, filed on Dec. 10, 2019. The entire content of the before-mentioned patent application is incorporated by reference as part of the disclosure of this application.

TECHNICAL FIELD

This patent document is directed generally to video and image encoding and decoding.

BACKGROUND

In the last three decades, a number of different video coding standards have been published for representing digital video into a compressed format by removing some visual redundancy and information in the digital video. During this time, pixel resolution of encoded video content has steadily risen from the early days of Source Input Format (SIF) resolution in MPEG-1 video standard to 4K or 8K video being currently contemplated. Accordingly, newer video coding standards have adopted more efficient and flexible coding techniques to accommodate increased resolution of video.

SUMMARY

This patent document describes, among other things, techniques for encoding and decoding digital video using techniques that can be used for signaling of subpictures in an encoded video bitstream and correspondingly decoding the encoded video bitstream into un-encoded video.

In one example aspect, a method of bitstream processing is disclosed. The method includes parsing a header at a video unit level in a video bitstream for a first field indicative of whether the video unit includes multiple network abstraction layer bit units having multiple types; parsing, due to determining that the video unit includes multiple network abstraction layer bit units having multiple types, a second field in the header indicative of whether the video unit comprises an intra random access point; and decoding, based on the first field and the second field, the video bitstream to generate a video.

In another example aspect, a method of parsing a video bitstream is disclosed. The method includes parsing, for decoding a video picture comprising one or more subpictures, a syntax structure to obtain type information about one or more network abstraction layer (NAL) units making up the video picture and whether the video picture is an intra random access picture and reconstructing the one or more subpictures based on the parsing.

In another example aspect, a method of encoding a video is disclosed. The method includes including, in a header at a video unit level in a video bitstream, a first field indicative of whether the video unit includes multiple network abstraction layer bit units having multiple types; further including, due to determining that the video unit includes multiple network abstraction layer bit units having multiple types, a second field in the header indicative of whether the video unit comprises an intra random access point; and encoding the video to generate the video bitstream.

In yet another example aspect, a video processing apparatus comprising a processor is disclosed. The processor is configured to implement an encoding or a decoding method described herein.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Figure 1:
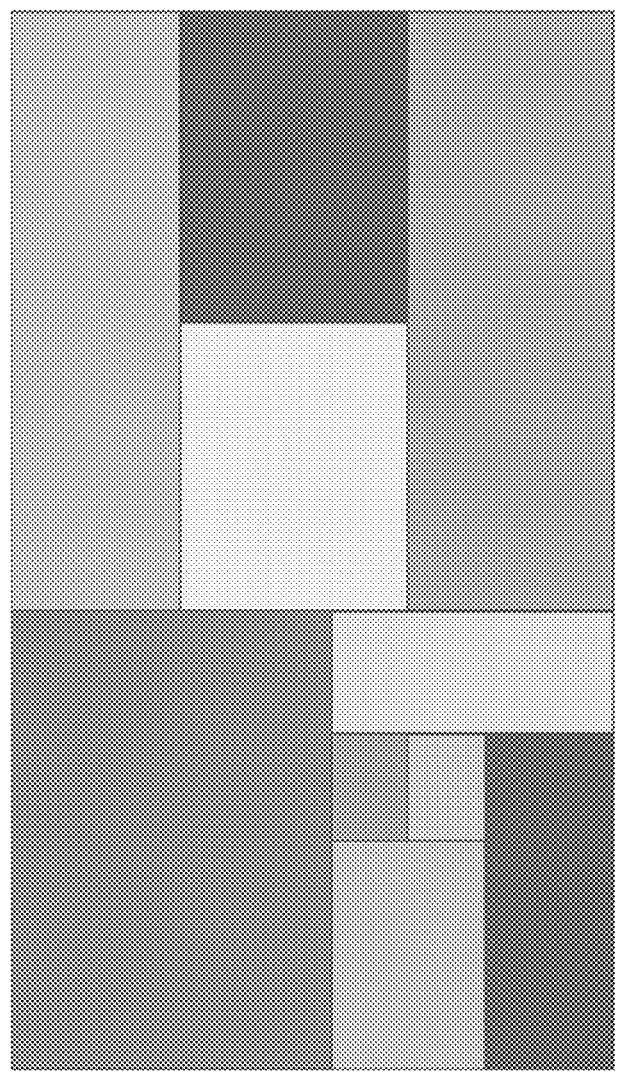
FIG. 1 shows an example of a video picture partitioned into multiple subpictures.

Section headings are used in the present document only to improve readability and do not limit scope of the disclosed embodiments and techniques in each section to only that section. Certain features are described using the example of the H.264/AVC (advanced video coding), H.265/HEVC (high efficiency video coding) and H.266 Versatile Video Coding (VVC) standards. However, applicability of the disclosed techniques is not limited to only H.264/AVC or H.265/HEVC or H.266/VVC systems.

This disclosure relates to video processing and communication, in particular to methods and apparatus for encoding a digital video or picture to generate a bitstream, methods and apparatus for decoding a bitstream to reconstruct a digital video or picture, methods and apparatus for extracting a bitstream to form a sub-bitstream.

Brief Discussion

Techniques for compressing digital video and picture utilize correlation characteristics among pixel samples to remove redundancy in the video and picture. An encoder may partition a picture into one or more regions containing a number of units. Such region breaks prediction dependencies within a picture, so that a region can be decoded or at least syntax elements corresponding to this region can be correctly parsed without referencing to data of another region in the same picture. Such region introduced in video coding standards is to facilitate resynchronization after data losses, parallel processing, region of interesting coding and streaming, packetized transmission, view-port dependent streaming, and etc. For example, in H.264/AVC standard, example of such region can be slice and slice group. In H.265/HEVC standard, example of such region can be slice and tile.

In the development of next-generation video coding standard, MPEG (Moving Picture Experts Group) has mandated that the next-generation video codec should enable efficient extraction of a desired viewport from the compressed bitstream. In addition, in applications involving 4K, 8K and even higher resolution videos, a viewer may be allowed to select a view-port for rendering on terminal devices, and thus it is useful to enable an efficient extraction of a sub-bitstream from the bitstream corresponding to the original resolution.

Since H.265/HEVC standard provides the highest coding efficiency among the current published video coding standards, H.265/HEVC is chosen as the codec in deploying the above described video services in the current stage. H.265/HEVC standard defines slice and tile. A picture can be partitioned into one or more tiles and slices. According to the H.265 standard, a conformance requirement is that one or both of the following conditions are fulfilled for each slice and tile:

All CTUs in a slice belong to the same tile.
All CTUs in a tile belong to the same slice.

By restricting the loop filtering operations at tile boundaries (e.g., loop_filter_across_tiles_enabled_flag set to 0 in PPS), a tile in a picture can be decoded independently without referencing the other region of the picture outside the tile. Suppose that the same tile partitioning is applied to all the pictures in a CVS (coded video sequence). Furthermore, if an encoder restricts a search range of a region consisting of one or more tiles as a collocated region of the tile in one or more reference pictures for inter prediction coding, a decoder will decode the region without referencing any other parts outside the region both spatially in the current decoding picture containing the region and temporally in reference pictures. Such a region can be referred to as a motion constrained tile set (MCTS).

In HEVC standard and Versatile Video Coding (VVC) standard (note that VVC Version 1 standardization process will be completed in July 2020), additional to the concept of tiles and slices, another picture partition called subpicture is also included. In general, subpictures, tiles and slices will form the video picture partition into non-overlapping regions which will cover the complete picture. Since subpictures, tiles and slices are rather independent concepts, overlapping between 3 of them can happen. For instance, a subpicture can be formed by multiple rectangular slices; a tile can also contain multiple rectangular slices; and also a slice can contain multiple tiles, etc.

Since VVC standard is required to support Virtual Reality (VR) application, therefore some large sized 360 degree video may have to be supported and coded. For such a large sized video, to use partitions in 360 video pictures are expected in video coding. One potential technique to use is "subpicture" partitions. Various subpictures, which all belong to a single picture, can be coded into different NAL unit types. Furthermore, the subpictures can be grouped together to support various random access operations.

1. One Example Embodiment

JVET-P2001vD (14 Nov. 2019), the current Versatile Video Coding (VVC) specification (spec) supports the concepts of subpictures, slices and tiles, in a normal video picture partition. In Section 6.3.1 "Partitioning of pictures into subpictures, slices, and tiles" it is stated: "A subpicture contains one or more slices that collectively cover a rectangular region of a picture."

In current VVC specification, the structure of subpictures is described in Sequence Parameter Set (SPS) as:

TABLE 1

| | Descriptor |
|---|---|
| seq_parameter_set_rbsp( ) { | |
|   sps_decoding_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |
|   sps_seq_parameter_set_id | u(4) |
|   chroma_format_idc | u(2) |
|   if( chroma_format_idc = = 3 ) | |
|     separate_colour_plane_flag | u(1) |
|   ref_pic_resampling_enabled_flag | u(1) |
|   pic_width_max_in_luma_samples | ue(v) |
|   pic_height_max_in_luma_samples | ue(v) |
|   sps_log2_ctu_size_minus5 | u(2) |
|   *subpics_present_flag* | u(1) |
|   *if( subpics_present_flag ) {* | |
|     *sps_num_subpics_minus1* | u(8) |
|     *for( i = 0; i < = sps_num_subpics_minus1; i+ + ) {* | |
|       *subpic_ctu_top_left_x[ i ]* | u(v) |
|       *subpic_ctu_top_left_y[ i ]* | u(v) |
|       *subpic_width_minus1[ i ]* | u(v) |
|       *subpic_height_minus1[ i ]* | u(v) |
|       *subpic_treated_as_pic_flag[ i ]* | u(1) |
|       *loop_filter_across_subpic_enabled_flag[ i ]* | u(1) |
|     } | |
|   } | |
|   sps_subpic_id_present_flag | u(1) |
|   if( sps_subpics_id_present flag ) { | |
|     sps_subpic_id_signalling_present_flag | u(1) |
|     if( sps_subpics_id_signalling_present_flag ) { | |
|       sps_subpic_id_len_minus1 | ue(v) |
|       for( i = 0; i <= sps_num_subpics_minus1; i++ ) | |
|         sps_subpic_id[ i ] | u(v) |
|     } | |
|   } | |
| ............... | |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | |

The italicized text in above SPS marks the way that subpictures are defined: in general, all the partitions are based on CTU (basic unit), by specifying top left X, Y locations plus subpictures width and height information, subpictures can be defined efficiently.

With current subpicture design, the partition of subpictures in FIG. 1 (each colored block is associated with a subpicture) can be supported. The processing order of all subpictures in FIG. 1 can be a number of ways, the key point is that when a subpicture is encoded, this subpicture's entire left boundary and top boundary should be available (for instance, or the boundary pixels are belonging to other subpictures that already processed (decoded), or the boundary is picture boundary).

Figure 2A:
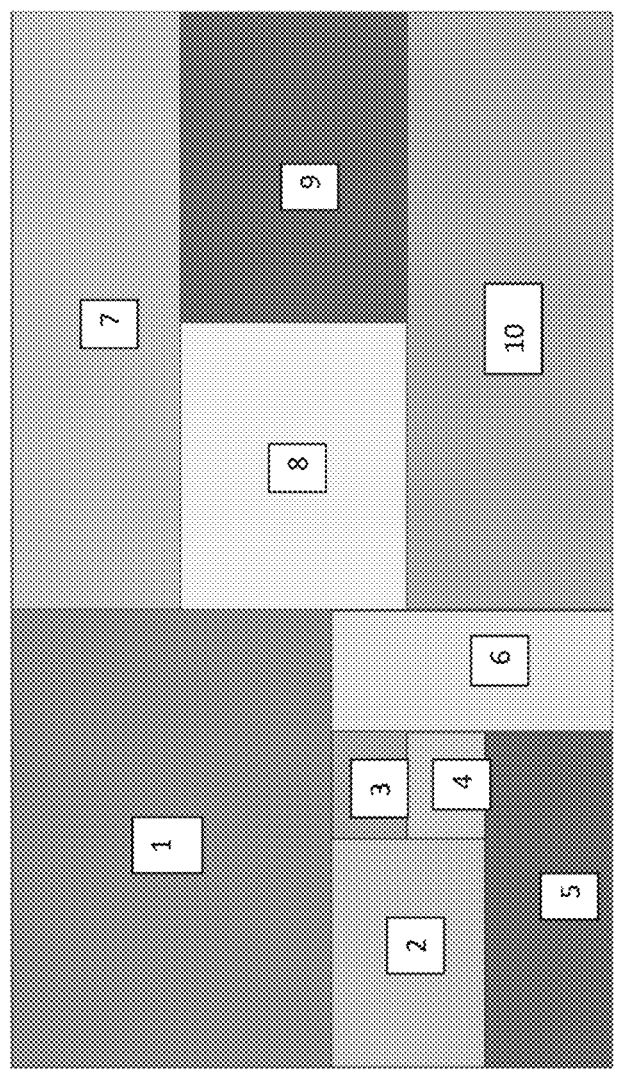
FIGS. 2A-2B show example processing orders when encoding or decoding a video picture comprising multiple subpictures.
Figure 2B:
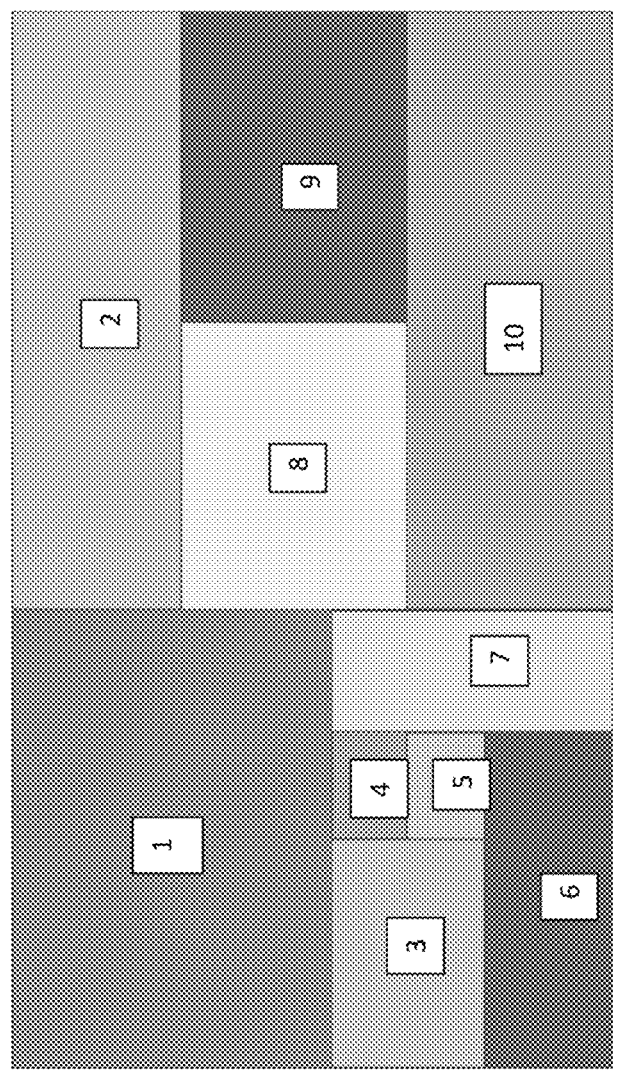

The possible two processing orders for these ten subpictures are given in FIGS. 2A and 2B.

2. One Example Embodiment

In the current VVC specification, the subpictures structure can be defined in Sequence Parameter Set (SPS). In the standard text VVC Draft 7 (November 2019), it is also clearly stated that one or more slices can be situated inside each subpicture. For each slice, its bitstream will form a NAL unit and will carry a NAL unit type (name and value). For better supporting random access function with VVC standard, a new syntax element, called "mixed_irap_nalu_types_in_pic_flag" can be added in Picture Parameter Set (PPS) as the follows (italicized for emphasis in Table 2):

TABLE 2

| | Descriptor |
|---|---|
| pic_parameter_set_rbsp( ) { | |
|    pps_pic_parameter_set_id | ue(v) |
|    pps_seq_parameter_set_id | u(4) |
|    ............... | |
|    output_flag_present_flag | u(1) |
|    mixed_nalu_types_in_pic_flag | u(1) |
|       if(mixed_nalu_types_in_pic_flag) | |
|          *mixed_irap_nalu_types_in_pic_flag* | u(1) |
|    pps_subpic_id_signalling_present_flag | u(1) |
|    ............ | |
|    pps_extension_flag | u(1) |
|    if( pps_extension_flag ) | |
|       while( more_rbsp_data( ) ) | |
|          pps_extension_data_flag | u(1) |
|    rbsp_trailing_bits( ) | |
| } | |

And the semantics will be:

mixed_nalu_types_in_pic_flag equal to 1 specifies that each picture referring to the PPS has more than one VCL NAL unit and that the VCL NAL units do not have the same value of nal_unit_type and that the picture is not an IRAP (intra random access picture). mixed_nalu_types_in_pic_flag equal to 0 specifies that each picture referring to the PPS has one or more VCL NAL units and the VCL NAL units of each picture referring to the PPS have the same value of nal_unit_type.

Above texts (in VVC Draft 7 JVET-P2001) are unchanged. But add the following:

mixed_irap_nalu_types_in_pic_flag equal to 1 specifies that each picture referring to the PPS has more than one VCL NAL unit and that the VCL NAL units do not have the same value of nal_unit_type and that the picture is with mixed nal_unit_types in the range of IDR_W_RADL to CRA_NUT, inclusive. mixed_irap_nalu_types_in_pic_flag equal to 0 specifies that each picture referring to the PPS has one or more VCL NAL units and the VCL NAL units of each picture referring to the PPS do not have the same value of nal_unit_type and that the picture is not an IRAP picture.

The key point to add this flag in PPS is to support a way of allowing mixed IRAP nalu_types in a picture in application. It is understood that it can also achieve the similar goal on supporting the mixed IRAP nalu_types in a picture by adding further standard texts as the bitstream constraint in VVC specification.

It will be appreciated that the techniques described in the present document may be incorporated within a video encoder apparatus or a video decoder apparatus to significantly improve the performance of the operation of encoding video or decoding video. For example, some video applications such as virtual reality experience or gaming require real-time (or faster than real-time) encoding or decoding of video to provide satisfactory user experience. The disclosed technique improve the performance such applications by using the picture-region based coding or decoding techniques as described herein. For example, coding or decoding of less-than-all portion of a video frame based on a user's viewpoint allows for selectively coding only video that will be viewed by the user. Furthermore, the reorganizing of picture blocks to create picture regions in a rectangular video frame allows for the use of standard rectangular-frame based video coding tools such as motion search, transformation and quantization.

Figure 3A:
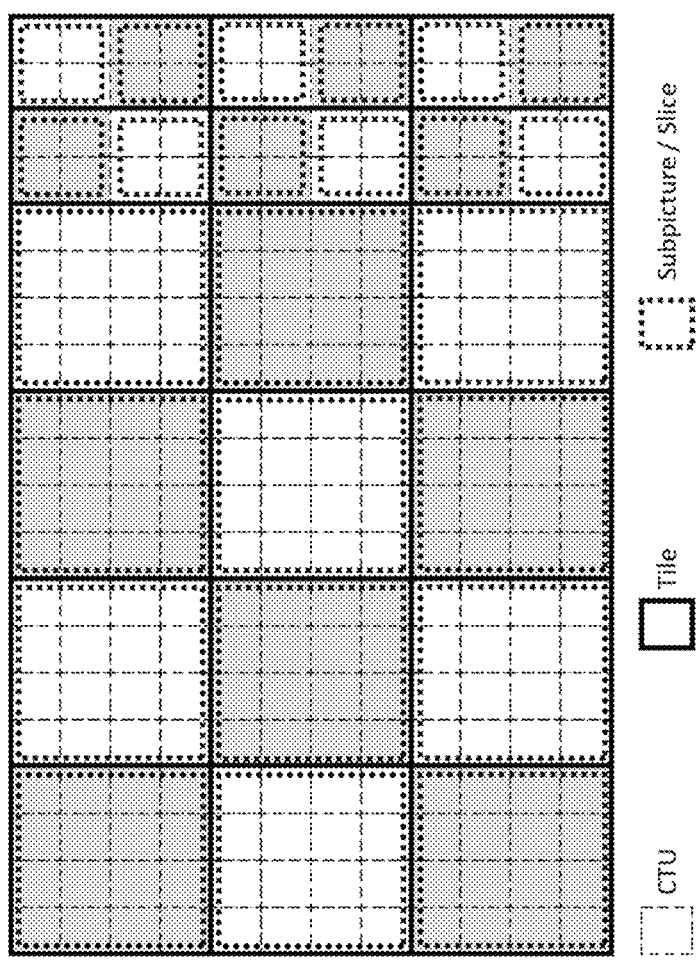
FIG. 3A shows an example of a video picture portioned into coding tree units (CTUs), tiles, slices and subpictures.

FIG. 3A shows an example of a video picture with CTUs, tiles and subpictures or slices. In the depicted picture, there are 18 tiles, 24 subpictures and 24 slices (20×12=240 CTUs).

3. Additional Information for Illustrating an Embodiment Using Current VVC Technology In addition to the previously described syntax examples of Table 1 and Table 2, the following text may be added to the current version of VVC codec to implement some embodiments.

In JVET-P2001 (VVC Draft 7), there is a design on indicating mixed NAL unit types for a video picture, which depends on a syntax element named as "mixed_nalu_types_in_pic_flag" in Picture Parameter Set (PPS). The present contribution proposes to add another syntax element as "mixed_irap_nalu_types_in_pic_flag" to indicate mixed irap nalu types and only irap nalu types in a video picture. The added indication will support wider range of applications, particularly involving subpictures partition applications. The added syntax element will also serve a purpose for a flexible random access point indications regarding rather independently coded subpictures in a video picture.

4. Introduction and Problem Statement 4.1 the Relevant Existing Design for NAL Unit Types in VVC Specification JVET-P2001:

The information below is extracted from JVET-P2001, The key information is highlighted with underline:

TABLE 3

In VVC Spec's Table 5 - NAL unit type codes and NAL unit type classes

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |

TABLE 3-continued

In VVC Spec's Table 5 - NAL unit type codes and NAL unit type classes

| nal_unit_type | Name of nal_unit_type | Content of NAL unit and RBSP syntax structure | NAL unit type class |
|---|---|---|---|
| 3 | RASL_NUT | Coded slice of a RASL picture slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture | VCL |
| 8 | IDR_N_LP | slice_layer_rbsp( ) | |
| 9 | CRA_NUT | Coded slice of a CRA picture silce_layer_rbsp( ) | VCL |
| 10 | GDR_NUT | Coded slice of a GDR picture slice_layer_rbsp( ) | VCL |
| 11 | RSV_IRAP_11 | Reserved IRAP VCL NAL unit types | VCL |
| 12 | RSV_IRAP_12 | | |
| 13 | DPS_NUT | Decoding parameter set decoding_parameter_set_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

Relating to random access conditions, some key terms are defined in VVC specification. In WET-P2001 spec, under 3 "Definitions":

clean random access (CRA) picture: An IRAP picture for which each VCL NAL unit has nal_unit_type equal to CRA_NUT.

NOTE—A CRA picture does not refer to any pictures other than itself for inter prediction in its decoding process, and may be the first picture in the bitstream in decoding order, or may appear later in the bitstream. A CRA picture may have associated RADL or RASL pictures. When a CRA picture has NoIncorrectPicOutputFlag equal to 1, the associated RASL pictures are not output by the decoder, because they may not be decodable, as they may contain references to pictures that are not present in the bitstream.

3.54 gradual decoding refresh (GDR) picture: A picture for which each VCL NAL unit has nal_unit_type equal to GDR_NUT.

instantaneous decoding refresh (IDR) picture: An IRAP picture for which each VCL NAL unit has nal_unit_type equal to IDR_W_RADL or IDR_N_LP.

NOTE—An IDR picture does not refer to any pictures other than itself for inter prediction in its decoding process, and may be the first picture in the bitstream in decoding order, or may appear later in the bitstream. Each IDR picture is the first picture of a CVS in decoding order. When an IDR picture for which each VCL NAL unit has nal_unit_type equal to IDR_W_RADL, it may have associated RADL pictures. When an IDR picture for which each VCL NAL unit has nal_unit_type equal to IDR_N_LP, it does not have any associated leading pictures. An IDR picture does not have associated RASL pictures.

intra random access point (IRAP) picture: A coded picture for which all VCL NAL units have the same value of nal_unit_type in the range of IDR_W_RADL to CRA_NUT, inclusive.

NOTE 1—An TRAP picture does not refer to any pictures other than itself for inter prediction in its decoding process, and may be a CRA picture or an IDR picture. The first picture in the bitstream in decoding order must be an TRAP or GDR picture. Provided the necessary parameter sets are available when they need to be referenced, the TRAP picture and all subsequent non-RASL pictures in the CVS in decoding order can be correctly decoded without performing the decoding process of any pictures that precede the TRAP picture in decoding order.

NOTE 2—The value of mixed_nalu_types_in_pic_flag for an TRAP picture is equal to 0. When mixed_nalu_types_in_pic_flag is equal to 0 for a picture, and any slice of the picture has nal_unit_type in the range of IDR_W_RADL to CRA_NUT, inclusive, all other slices of the picture have the same value of nal_unit_type, and the picture is known to be an IRAP picture.

For an indication of mixed type of NAL unit types for a picture, the flag (syntax element) "mixed_nalu_types_in_pic_flag" has been located in PPS (Picture Parameter Set) as shown in Table 4.

TABLE 4

| | Descriptor |
|---|---|
| pic_parameter_set_rbsp( ) { | |
|   pps_pic_parameter_set_id | ue(v) |
|   pps_seq_parameter_set_id | u(4) |
|   ............................................ | |
|   output_flag_present_flag | u(1) |
|   mixed_nalu_types_in_pic_flag | u(1) |
|   pps_subpic_id_signalling_present_flag | u(1) |
|   ............................................ | |
|   pps_extension_flag | u(1) |
|   if( pps_extension_flag ) | |
|     while( more_rbsp_data( ) ) | |
|       pps_extension_data_flag | u(1) |
|   rbsp_trailing_bits( ) | |
| } | |

In VVC spec, under 7.4.3.4 Semantics:

mixed_nalu_types_in_pic_flag equal to 1 specifies that each picture referring to the PPS has more than one VCL NAL unit and that the VCL NAL units do not have the same value of nal_unit_type and that the picture is not an TRAP picture. mixed_nalu_types_in_pic_flag equal to 0 specifies that each picture referring to the PPS has one or more VCL NAL units and the VCL NAL units of each picture referring to the PPS have the same value of nal_unit_type.

When no_mixed_nalu_types_in_pic_constraint_flag is equal to 1, the value of mixed_nalu_types_in_pic_flag shall be equal to 0.

For each slice with a nal_unit_type value nalUnitTypeA in the range of IDR_W_RADL to CRA_NUT, inclusive, in a picture picA that also contains one or more slices with another value of nal_unit_type (i.e., the value of mixed_nalu_types_in_pic_flag for the picture picA is equal to 1), the following applies:

The slice shall belong to a subpicture subpicA for which the value of the corresponding subpic_treated_aspic_flag[i] is equal to 1.

The slice shall not belong to a subpicture of picA containing VCL NAL units with nal_unit_type not equal to nalUnitTypeA.

For all the following PUs in the CLVS in decoding order, neither RefPicList[0] nor RefPicList[1] of a slice in subpicA shall include any picture preceding picA in decoding order in an active entry.

The flag "no_mixed_nalu_types_in_pic_constraint_flag" has been located inside general constraint info( )) as the follows:

TABLE 5

| | Descriptor |
|---|---|
| general_constraint_info( ) { | |
|   general_progressive_source_flag | u(1) |
|   general_interlaced_source_flag | u(1) |
|   ........................................ | |
|   no_sign_data_hiding_constraint_flag | u(1) |
|   no_mixed_nalu_types_in_pic_constraint_flag | u(1) |
|   no_trail_constraint_flag | u(1) |
|   ........................................ | |
|   while( !byte_aligned( ) ) | |
|     gci_alignment_zero_bit | f(1) |
|   num_reserved_constraint_bytes | u(8) |
|   for( i = 0; i < num_reserved_constraint_bytes; i++ ) | |
|     gci_reserved_constraint_byte[ i ] | u(8) |
| } | |

The relevant semantics:

no_mixed_nalu_types_in_pic_constraint_flag equal to 1 specifies that it is a requirement of bitstream conformance that mixed_nalu_types_in_pic_flag shall be equal to 0. no_mixed_nalu_types_in_pic_constraint_flag equal to 0 does not impose such a constraint.

In VVC spec under 7.4.2.2 "NAL unit header semantics", it states:

For VCL NAL units of any particular picture, the following applies:

If mixed_nalu_types_in_pic_flag is equal to 0, the value of nal_unit_type shall be the same for all coded slice NAL units of a picture. A picture or a PU is referred to as having the same NAL unit type as the coded slice NAL units of the picture or PU.

Otherwise (mixed_nalu_types_in_pic_flag equal to 1), one or more of the VCL NAL units shall all have a particular value of nal_unit_type in the range of IDR_W_RADL to CRA_NUT, inclusive, and the other VCL NAL units shall all have a particular value of nal_unit_type in the range of TRAIL_NUT to RSV_VCL_6, inclusive, or equal to GRA_NUT.

Note that there is a typo in above paragraph. The word "GRA_NUT" is not correct; for instance. In above Table 5, there is no entry for "GRA_NUT". A fix has been provided in JVET-Q004 for current VVC specification: replacing GRA_NUT with GDR_NUT. The typo is highlighted in bold face underline.

Figure 3B:
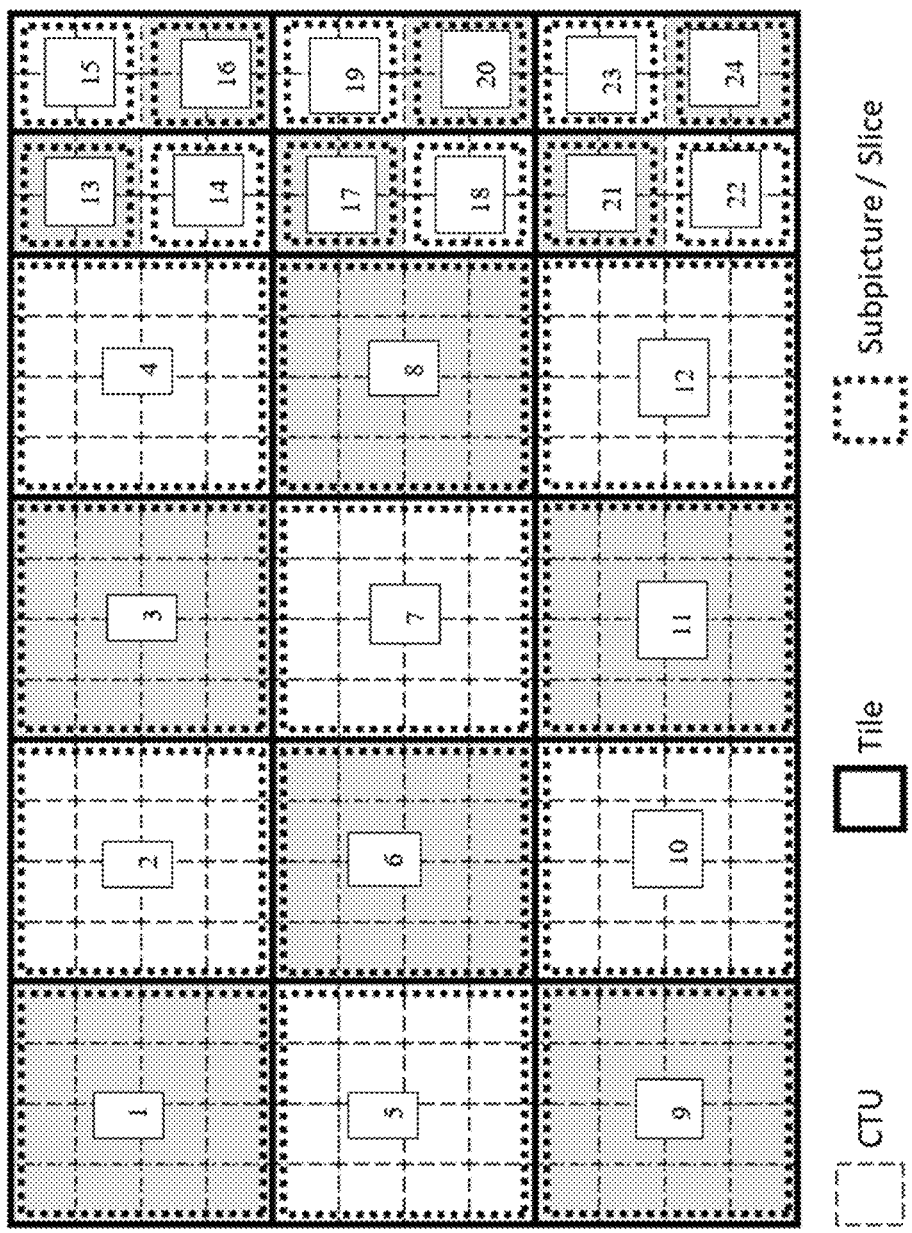
FIG. 3B shows a video picture having 24 subpictures and 24 slices.

4.2 Handling Subpictures with VVC Specification JVET-P2001:

In the example video picture shown in FIG. 3B, there are 18 tiles, 24 subpictures and 24 slices (20×12=240 CTUs).

Figure 7:
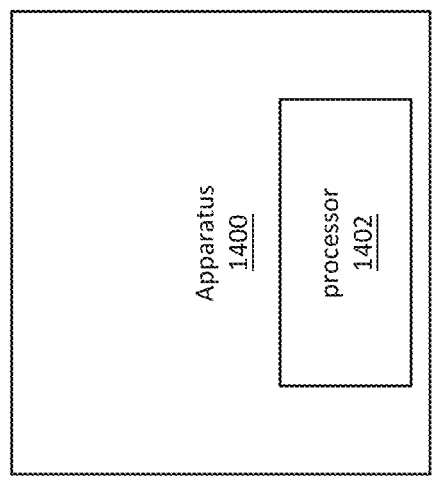
FIG. 7 shows an example of a video processing hardware platform.

In one potential use case, in which we coded every picture using the partitions in above "FIG. 7", we only choose to display subpictures 5, 6, 9, 10 (a rectangular region) to start. At one random access point along the time line, we want to make a scene change (cut) to display subpictures 6, 7, 10, 11 instead of original 5, 6, 9, 10. If we follow the exact constraints in current VVC spec (JVET-P2001), at that random access point, we will have all the subpictures marked in above Figure from 1 to 24 to have the exact same IRAP NAL unit type (for instance, IDR_N_LP for all 24 subpictures, or CRA_NUT for all 24 subpictures). If we want to have a mixed NAL unit types case, then we can not guarantee we only have IRAP subpictures/pictures.

5. Proposed Solution

It is proposed to add one more flag "mixed_irap_nalu_types_in_pic_flag" in PPS as shown in Table 2:

The unchanged semantics as:

mixed_nalu_types_in_pic_flag equal to 1 specifies that each picture referring to the PPS has more than one VCL NAL unit and that the VCL NAL units do not have the same value of nal_unit_type and that the picture is not an IRAP picture. mixed_nalu_types_in_pic_flag equal to 0 specifies that each picture referring to the PPS has one or more VCL NAL units and the VCL NAL units of each picture referring to the PPS have the same value of nal_unit_type.

The added new semantics as:

mixed_irap_nalu_types_in_pic_flag equal to 1 specifies that each picture referring to the PPS has more than one VCL NAL unit and that the VCL NAL units do not have the same value of nal_unit_type and that the picture is with mixed nal_unit_types in the range of IDR_W_RADL to CRA_NUT, inclusive. mixed_irap_nalu_types_in_pic_flag equal to 0 specifies that each picture referring to the PPS has one or more VCL NAL units and the VCL NAL units of each picture referring to the PPS do not have the same value of nal_unit_type and that the picture is not an IRAP picture.

With added "mixed_irap_nalu_types_in_pic_flag", the VVC spec can provide an improved support to mixed random access NAL unit types indication.

For application standard, like DVB standard, the added flag will provide a more flexible indication mechanism for random access indication support.

Figure 4:
FIG. 4 shows a block diagram of an example video encoder.

FIG. 4 is a diagram illustrating a first example device containing at least the example video encoder or picture encoder.

Acquisition unit 1001 captures video and picture. Acquisition unit 1001 may be equipped with one or more cameras for shooting a video or a picture of nature scene. Optionally, acquisition unit 1001 may be implemented with a camera to get depth video or depth picture. Optionally, acquisition unit 1001 may include a component of an infrared camera. Optionally, acquisition unit 1001 may be configured with a remote sensing camera. Acquisition unit 1001 may also be an apparatus or a device of generating a video or a picture by scanning an object using radiation.

Optionally, acquisition unit 1001 may perform pre-processing on video or picture, for example, automatic white balance, automatic focusing, automatic exposure, backlight compensation, sharpening, denoising, stitching, up-sampling/down sampling, frame-rate conversion, virtual view synthesis, and etc.

Acquisition unit 1001 may also receive a video or picture from another device or processing unit. For example, acquisition unit 1001 can be a component unit in a transcoder. The transcoder feeds one or more decoded (or partial decoded) pictures to acquisition unit 1001. Another example is that acquisition unit 1001 get a video or picture from another device via a data link to that device.

Note that acquisition unit 1001 may be used to capture other media information besides video and picture, for example, audio signal. Acquisition unit 1001 may also receive artificial information, for example, character, text, computer-generated video or picture, and etc.

Encoder 1002 is an implementation of the example encoder. Input of encoder 1002 is the video or picture outputted by acquisition unit 1001. Encoder 1002 encodes the video or picture and outputs generated a video or picture bitstream.

Storage/Sending unit 1003 receives the video or picture bitstream from encoder 1002, and performs system layer processing on the bitstream. For example, storage/sending unit 1003 encapsulates the bitstream according to transport standard and media file format, for example, e.g. MPEG-2 TS, ISOBMFF, DASH, MMT, and etc. Storage/Sending unit 1003 stores the transport stream or media file obtained after encapsulation in memory or disk of the first example device, or sends the transport stream or media file via wireline or wireless networks.

Note that besides the video or picture bitstream from encoder 1002, input of storage/sending unit 1003 may also include audio, text, image, graphic, and etc. Storage/sending unit 1003 generates a transport or media file by encapsulating such different types of media bitstreams.

The first example device described in this embodiment can be a device capable of generating or processing a video (or picture) bitstream in applications of video communication, for example, mobile phone, computer, media server, portable mobile terminal, digital camera, broadcasting device, CDN (content distribution network) device, surveillance camera, video conference device, and etc.

Figure 5:
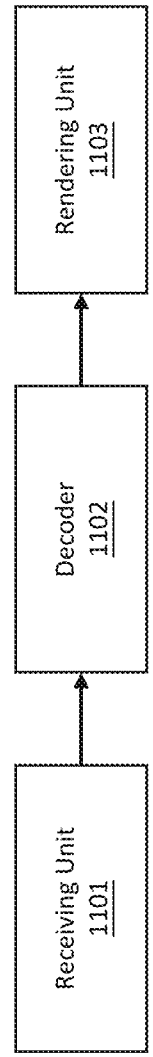
FIG. 5 shows a block diagram of an example video decoder.

FIG. 5 is a diagram illustrating a second example device containing at least the example video decoder or picture decoder.

Receiving unit 1101 receives video or picture bitstream by obtaining bitstream from wireline or wireless network, by reading memory or disk in an electronic device, or by fetching data from other device via a data link.

Input of receiving unit 1101 may also include transport stream or media file containing video or picture bitstream. Receiving unit 1101 extracts video or picture bitstream from transport stream or media file according to specification of transport or media file format.

Receiving unit 1101 outputs and passes video or picture bitstream to decoder 1102. Note that besides video or picture bitstream, output of receiving unit 1101 may also include audio bitstream, character, text, image, graphic and etc. Receiving unit 1101 passes the output to corresponding processing units in the second example device. For example, receiving unit 1101 passes the output audio bitstream to audio decoder in this device.

Decoder 1102 is an implementation of the example decoder. Input of encoder 1102 is the video or picture bitstream outputted by receiving unit 1101. Decoder 1102 decodes the video or picture bitstream and outputs decoded video or picture.

Rendering unit 1103 receives the decoded video or picture from decoder 1102. Rendering unit 1103 presents the decoded video or picture to viewer. Rendering unit 1103 may be a component of the second example device, for example, a screen. Rendering unit 1103 may also be a separate device from the second example device with a data link to the second example device, for example, projector, monitor, TV set, and etc. Optionally, rendering 1103 performs post-processing on the decoded video or picture before presenting it to viewer, for example, automatic white balance, automatic focusing, automatic exposure, backlight compensation, sharpening, denoising, stitching, up-sampling/down sampling, frame-rate conversion, virtual view synthesis, and etc.

Note that besides decoded video or picture, input of rendering unit 1103 can be other media data from one or more units of the second example device, for example, audio, character, text, image, graphic, and etc. Input of rendering unit 1103 may also include artificial data, for example, lines and marks drawn by a local teacher on slides for attracting attention in remote education application. Rendering unit 1103 composes the different types of media together and then presented the composition to viewer.

The second example device described in this embodiment can be a device capable of decoding or processing a video (or picture) bitstream in applications of video communication, for example, mobile phone, computer, set-top box, TV set, HMD, monitor, media server, portable mobile terminal, digital camera, broadcasting device, CDN (content distribution network) device, surveillance, video conference device, and etc.

Figure 6:
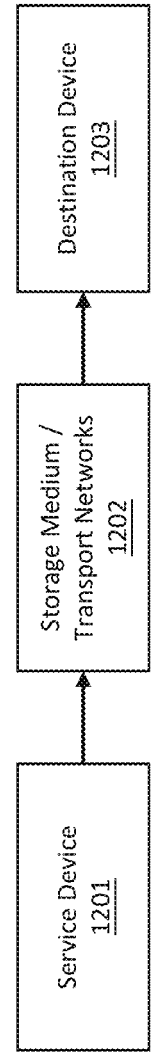
FIG. 6 shows an example of a video system.

FIG. 6 is a diagram illustrating an electronic system containing the first example device in FIG. 5 and the second example device in FIG. 4.

Service device 1201 is the first example device in FIG. 4.

Storage medium/transport networks 1202 may include internal memory resource of a device or electronic system, external memory resource that is accessible via a data link, data transmission network consisting of wireline and/or wireless networks. Storage medium/transport networks 1202 provides storage resource or data transmission network for storage/sending unit 1203 in service device 1201.

Destination device 1203 is the second example device in FIG. 5. Receiving unit 1201 in destination device 1203 receives a video or picture bitstream, a transport stream containing video or picture bitstream or a media file containing video or picture bitstream from storage medium/transport networks 1202.

The electronic system described in this embodiment can be a device or system capable of generating, storing or transporting, and decoding a video (or picture) bitstream in applications of video communication, for example, mobile phone, computer, IPTV systems, OTT systems, multimedia systems on Internet, digital TV broadcasting system, video surveillance system, potable mobile terminal, digital camera, video conference systems, and etc.

FIG. 7 shows an example apparatus 1400 that may be used to implement encoder-side or decoder-side techniques described in the present document. The apparatus 1400 includes a processor 1402 that may be configured to perform the encoder-side or decoder-side techniques or both. The apparatus 1400 may also include a memory (not shown) for storing processor-executable instructions and for storing the video bitstream and/or display data. The apparatus 1400 may include video processing circuitry (not shown), such as transform circuits, arithmetic coding/decoding circuits, look-up table based data coding techniques and so on. The video processing circuitry may be partly included in the processor and/or partly in other dedicated circuitry such as graphics processors, field programmable gate arrays (FPGAs) and so on.

Figure 8:
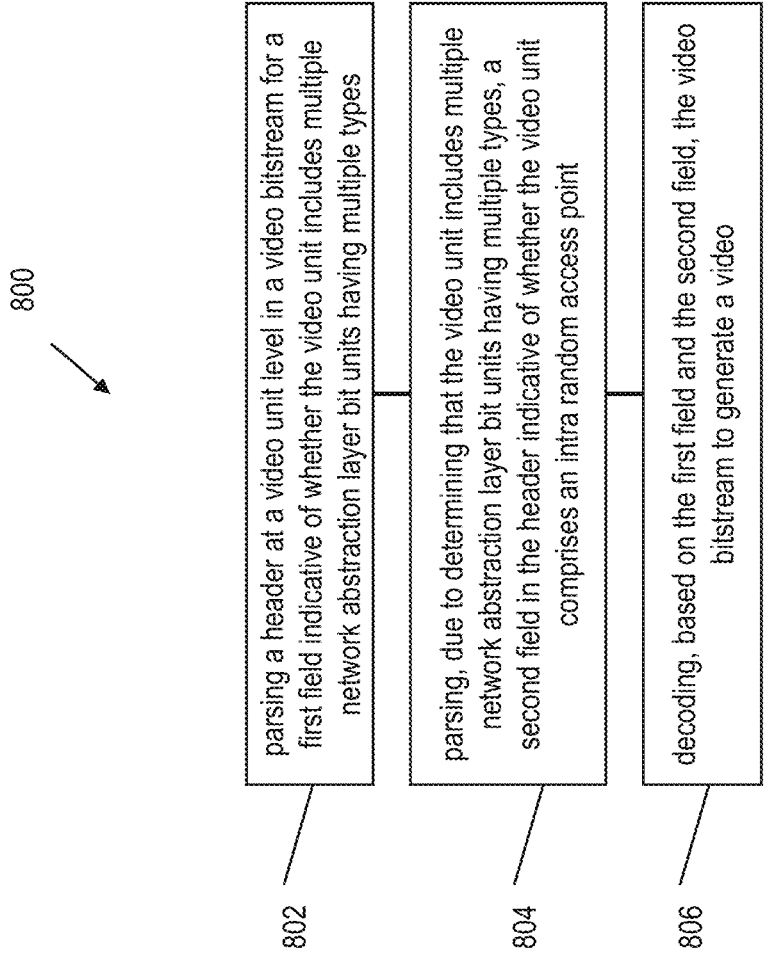
FIG. 8 is a flowchart for an example method of video processing.

FIG. 8 is a flowchart for an example method 800 for video bitstream processing. The method 800 may be implemented by a video decoder described in the present document. The method 800 (and 900, described next) may be implemented using a hardware platform such as described with reference to FIG. 7.

The method 800 includes parsing (802) a header at a video unit level in a video bitstream for a first field indicative of whether the video unit includes multiple network abstraction layer bit units having multiple types. In some embodiments, the video unit may be a video picture (e.g., as shown in FIG. 3A-3B).

The method 800 includes further parsing (804), due to determining that the video unit includes multiple network abstraction layer bit units having multiple types, a second field in the header indicative of whether the video unit comprises an intra random access point.

The method 800 includes decoding (806), based on the first field and the second field, the video bitstream to generate a video.

In some embodiments, both the first and second fields may be single bit fields. On advantage of such embodiments is to maintain backward compatibility with legacy standards while introducing lowest amount of overhead (a single bit) in introducing the additional information communicated by the second bit.

In some embodiments, the first bit and the second bit may be included in different positions within the header. Alternatively, in some embodiments, the two bits may be consecutive to each other. In some cases, whether or not the second field is included in the header may depend on a value of the first field. For example, a zero value in the first field may indicate that the second field is not included.

Figure 9:
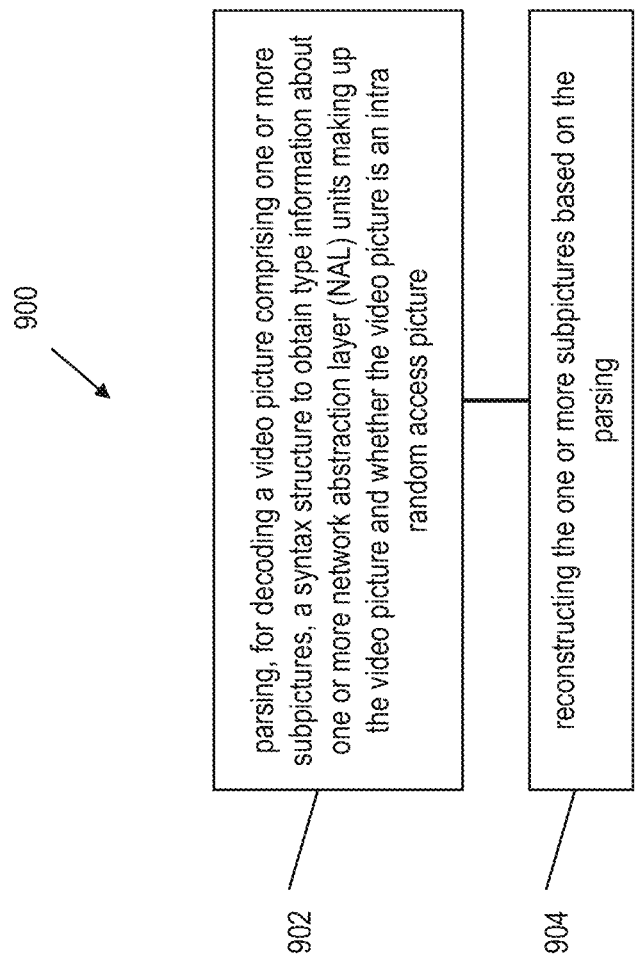
FIG. 9 is a flowchart for an example method of video processing.

FIG. 9 shows is a flowchart for another example method 900 of video bitstream parsing.

The method 900 includes, at 902, parsing, for decoding a video picture comprising one or more subpictures, a syntax structure to obtain type information about one or more network abstraction layer (NAL) units making up the video picture and whether the video picture is an intra random access picture (IRAP).

The method 900 includes, at 904, reconstructing the one or more subpictures based on the parsing.

In some embodiments, the syntax structure is indicative of whether the one or more NAL units comprise multiple NAL units.

In some embodiments, the syntax structure may include a first field and an optional second field whose presence is dependent on a value of the first field, and wherein the first field is indicative of whether mixed types of NAL units are present in the one or more NAL units. For example, as described before, the first and the second fields may be single bit fields that are consecutively positioned within the bitstream.

As described in Sections 1 to 4, the syntax structure may be included in a picture parameter set (PPS) in the video bitstream. Alternatively, or additionally, the syntax structure may be included in a header field.

As further described in, for example, Sections 2 and 4, the syntax structure may be configured to have multiple values. One value may indicate that a video picture referring to the PPS that includes the syntax structure includes multiple NAL units and the multiple NAL units do not have a same value of NAL unit type.

As further described in, for example, Sections 2 and 4, the syntax structure may be configured to have multiple values. One value may indicate that the video picture is not IRAP.

As further described in, for example, Sections 2 and 4, the syntax structure may be constrained to a particular value if the video picture includes only a single NAL unit. In other words, the syntax structure may be disallowed to use values other than the particular value. Otherwise, the syntax structure may be allowed to have more than one values, depending on type of subpictures included in the picture.

As further described in, for example, Sections 2 and 4, the video bitstream may have a syntax according to a rule that the slice shall not belong to a subpicture of a video picture pica containing a video layer NAL unit with nal_unit_type not equal to nalUnitTypeA. Accordingly, for a particular subpicture of the video picture having a particular NAL unit type, the parsing comprises parsing according to a rule that a slice having a NAL unit type different than the particular NAL unit type is included in the particular subpicture.

As further described in, for example, Sections 2 and 4, one rule of construction of the video bitstream may be that the slice shall belong to a subpicture for which the value of a corresponding subpicpic_treated_aspic_flag[i] is equal to 1. Accordingly, the parsing may include parsing the video bitstream according to a rule that a particular subpicture of the video picture is allowed to include a slice only when the video bitstream indicates that the particular subpicture is to be treated as a picture.

As further described in, for example, Sections 2 and 4, another rule for bitstream encoding/decoding may be about how encoded pictures are included in the video bitstream in a decoding order. Accordingly, in some embodiments the parsing comprises parsing the video bitstream according to a rule that disables, for a slice in a particular subpicture of the video picture, use of reference pictures preceding the video picture in a decoding order.

Figure 10:
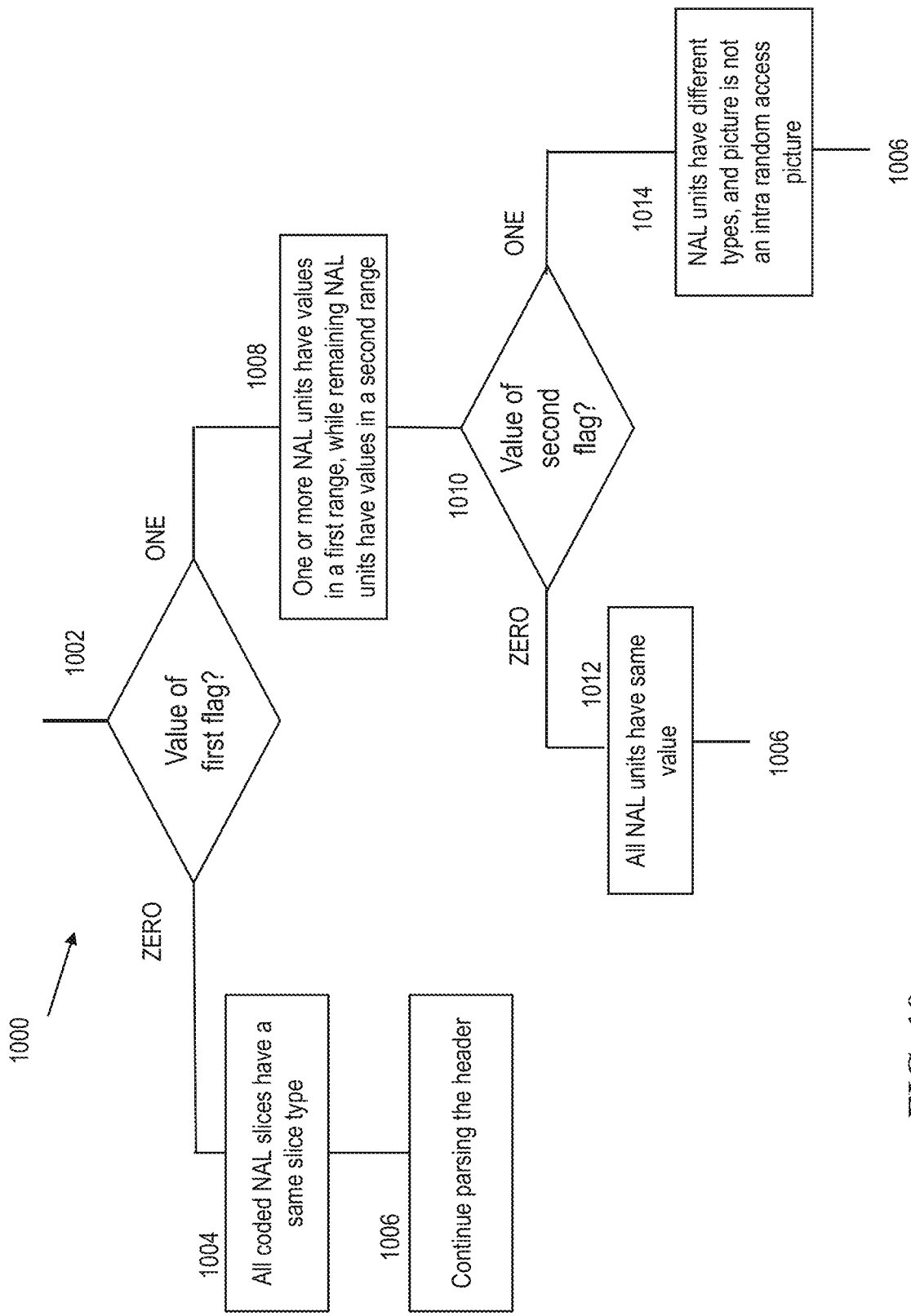
FIG. 10 is a flowchart for an example method of parsing a bitstream.

FIG. 10 shows an example flowchart 1000 that may be used for signaling or inferring presence of subpictures in a video picture. Such subpictures may be used, for example, to convey 3D picture information.

At 1002, a check is made about value of a first flag. This value may be set to a specific value, e.g., 0, to indicate that the picture includes all NAL slices that have a same slice type (1004). For example, this flag may be used to indicate that the current picture is a "traditional" picture, with no independently decodable subpictures included. Upon the determination that all NAL slices have same type (1004), the header may be further parsed (1006) for additional information.

If the check at 1002 reveals that the first flag has a second value (e.g., 1), then it is inferred that the there are multiple NAL units and these NAL units possibly may have different values. A check may be performed, at 1010, for a value of a second flag. If the value is a specific value (e.g., 0), then it is determined that all NAL units have same value (1012). After the determination, the header may be parsed for further information (1006). If the check at 1010 reveals that the second flag has another specific value, it is inferred that the NAL units have different types, but the picture is not an intra random access picture (1014).

From the logic flow depicted in FIG. 10, it will be appreciated that introducing a single bit to the existing syntax structure of a picture header enables signaling of presence of subpictures in a video picture. The signaling is compatible with presently existing signaling of slices and/or tiles and/or CTUs.

Figure 11:
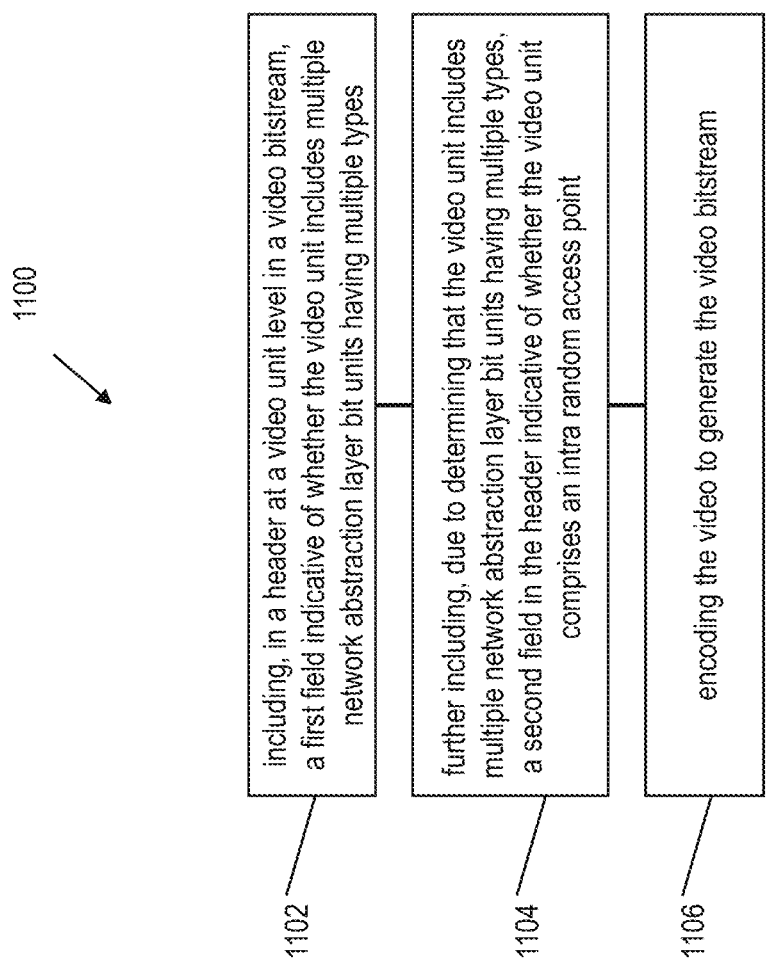
FIG. 11 is a flowchart for an example method of video encoding.

In some embodiments, a method of encoding a video (e.g., method 1100 depicted in FIG. 11) comprises: including (1102), in a header at a video unit level in a video bitstream, a first field indicative of whether the video unit includes multiple network abstraction layer bit units having multiple types; selectively further including (1104), due to determining that the video unit includes multiple network abstraction layer bit units having multiple types, a second field in the header indicative of whether the video unit comprises an intra random access point; and encoding (1106) the video to generate the video bitstream. The encoding may, for example, use various intra, inter and other techniques to represent video data within the bitstream.

In some embodiments, the video unit is a video picture.

As previously described, in some embodiments, the first field and the second field are one-bit fields. However, other lengths of these fields are possible throughout the present document.

The second field may be positioned immediately following the first field in the video bitstream.

In some embodiments, the encoding 1106 comprises encoding multiple subpictures into the video unit, and wherein each subpicture has an independent network abstraction layer unit type.

In some embodiments, a video encoding method may include generating, for encoding a video picture comprising one or more subpictures, a syntax structure to include type information about one or more network abstraction layer (NAL) units making up the video picture and whether the video picture is an intra random access picture; and encoding the one or more subpictures based on the syntax structure.

In the above-disclosed encoding method, in some embodiments, the syntax structure may include a first field indicative of whether the one or more NAL units may include multiple NAL units.

In some embodiments, the syntax structure includes a first field and an optional second field whose presence is dependent on a value of the first field, and wherein the first field is indicative of whether mixed types of NAL units are present in the one or more NAL units.

In some embodiments, the first field and the second field are single bit flags that are positioned immediately next to each other in the video bitstream.

In some embodiments, a video encoder, e.g., as depicted in FIG. 7, may implement the encoding method described above. In some embodiments, a video decoder, e.g., as depicted in FIG. 7, may implement a video bitstream parsing method described herein. The video decoder may be, for example, a transcoder that changes video from one bitstream representation to another bitstream representation.

For example, the video encoder may implement a method of constructing a bitstream that is described with reference to FIG. 9. This method may include constructing, for encoding a video picture comprising one or more subpictures, a syntax structure that includes type information about one or more network abstraction layer (NAL) units making up the video picture and whether the video picture is an intra random access picture (IRAP) and generating the video bitstream by including the syntax structure and by encoding the video picture. Various embodiments described herein discloses various features of the video bitstream that are possible in various embodiments.

In some embodiments, computer program product may include a computer readable medium that includes processor-executable code for implementing a method described herein and in the claims.

6. Industrial Applicability

From the above description, it can be known that techniques that enable signaling of subpictures that are not necessarily intra random access points, such as subpictures containing different view data for a 3D picture, are disclosed. Using the disclosed techniques, some embodiments of video encoders or video decoders are able to use a picture header with a least number of bit added to the syntax structure to be able to support carriage of subpictures, while at the same time keeping backward compatibility with signaling of slices, CTUs and such.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video bitstream processing, comprising:
   parsing, for decoding a video picture comprising subpictures, a syntax structure to obtain type information about network abstraction layer (NAL) units making up the video picture and whether the network abstraction layer bit units have mixed NAL unit types in a range IDR_W_RADL to CRA_NUT,
   wherein the syntax structure is constrained to a particular value in case that the video picture includes only one NAL unit; and
   decoding the subpictures based on the parsing.

2. The method of claim 1, wherein the syntax structure is included in a picture parameter set (PPS).

3. The method of claim 2, wherein a value of the syntax structure indicates that a video picture referring to the PPS that includes the syntax structure includes multiple NAL units and the multiple NAL units do not have a same value of NAL unit type.

4. The method of claim 3, wherein the value of the syntax structure further specifies that the video picture is not an intra random access picture, IRAP.

5. The method of claim 1, wherein a value of the syntax structure is disallowed for use in case that the video picture corresponds to a single NAL unit.

6. The method of claim 1, wherein, for a particular subpicture of the video picture having a particular NAL unit type, the parsing comprises parsing according to a rule that a slice having a NAL unit type different than the particular NAL unit type is included in the particular subpicture.

7. The method of claim 1, wherein the parsing comprises parsing the video bitstream according to a rule that a particular subpicture of the video picture is allowed to include a slice only when the video bitstream indicates that the particular subpicture is to be treated as a picture.

8. The method of claim 1, wherein the parsing comprises parsing the video bitstream according to a rule that disables, for a slice in a particular subpicture of the video picture, use of reference pictures preceding the video picture in a decoding order.

9. A video decoding apparatus comprising a processor, the processor being configured for implementing a video bitstream processing method, comprising:
   parsing, for decoding a video picture comprising subpictures comprising one or more slices, a syntax structure in a picture parameter set, PPS, of the video bitstream to obtain type information about one or more network abstraction layer (NAL) units making up the video picture and whether the network abstraction layer bit units have mixed NAL unit types in a range IDR_W_RADL to CRA_NUT, wherein the syntax structure is constrained to a particular value in case that the video picture includes only one NAL unit; and
   reconstructing the video picture based on the parsing.

10. The apparatus of claim 9, wherein a value of the syntax structure indicates that every video picture referring to the PPS that includes the syntax structure includes multiple NAL units and the multiple NAL units do not have a same value of NAL unit type and the video picture is not IRAP.

11. The apparatus of claim 9, wherein, for a particular subpicture of the video picture having a particular NAL unit type, the parsing comprises parsing according to a rule that a slice having a NAL unit type different than the particular NAL unit type is included in the particular subpicture.

12. The apparatus of claim 9, wherein the parsing comprises parsing the video bitstream according to a rule that a particular subpicture of the video picture is allowed to include a slice only when the video bitstream indicates that the particular subpicture is to be treated as a picture.

13. The apparatus of claim 9, wherein the parsing comprises parsing the video bitstream according to a rule that disables, for a slice in a particular subpicture of the video picture, use of reference pictures preceding the video picture in a decoding order.

14. A video bitstream encoding method, comprising:
  constructing, for encoding a video picture comprising subpictures, a syntax structure that includes type information about network abstraction layer (NAL) units making up the video picture and whether the network abstraction layer units have mixed NAL unit types in a range IDR_W_RADL to CRA_NUT, wherein the constructing comprises:
    determining that the video picture is to be coded using only one NAL unit, and based on the determination that the video picture is to be coded using only one NAL unit, constraining the syntax structure to a particular value; and
  generating the video bitstream by including the syntax structure and by encoding the video picture.

15. The method of claim 14, wherein the syntax structure is included in a picture parameter set (PPS).

16. The method of claim 15, wherein a value of the syntax structure indicates that a video picture referring to the PPS that includes the syntax structure includes multiple NAL units and the multiple NAL units do not have a same value of NAL unit type.

17. The method of claim 16, wherein the value of the syntax structure further specifies that the video picture is not an intra random access point, IRAP, and
  wherein a value of the syntax structure is disallowed for use in case that the video picture corresponds to a single NAL unit.

18. A video encoding apparatus comprising a processor configured for:
  constructing, for encoding a video picture comprising one or more subpictures, a syntax structure that includes type information about one or more network abstraction layer (NAL) units making up the video picture and whether the network abstraction layer units have mixed NAL unit types in a range IDR_W_RADL to CRA_NUT video picture is an intra random access picture (TRAP), wherein the constructing comprises:
    determining that the video picture is to be coded using only one NAL unit, and based on the determination that the video picture is to be coded using only one NAL unit, constraining the syntax structure to a particular value; and
  generating the video bitstream by including the syntax structure and by encoding the video picture.

19. The apparatus of claim 18, wherein, for a particular subpicture of the video picture having a particular NAL unit type, the parsing comprises parsing according to a rule that a slice having a NAL unit type different than the particular NAL unit type is included in the particular subpicture.

20. The apparatus of claim 18, wherein the constructing comprises constructing the video bitstream according to a rule that a particular subpicture of the video picture is allowed to include a slice only when the video bitstream indicates that the particular subpicture is to be treated as a picture.

* * * * *